(12) United States Patent
Kaminsky et al.

(10) Patent No.: US 8,495,500 B2
(45) Date of Patent: Jul. 23, 2013

(54) PORTAL-BASED PODCAST DEVELOPMENT

(75) Inventors: David L. Kaminsky, Chapel Hill, NC (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1699 days.

(21) Appl. No.: 11/443,969

(22) Filed: May 31, 2006

(65) Prior Publication Data

US 2007/0283272 A1    Dec. 6, 2007

(51) Int. Cl.
*G06F 3/00* (2006.01)

(52) U.S. Cl.
USPC .......................................................... 715/742

(58) Field of Classification Search
USPC .......................................... 715/733, 742, 738
See application file for complete search history.

(56) References Cited

U.S. PATENT DOCUMENTS

| | | | |
|---|---|---|---|
| 6,760,916 | B2 | 7/2004 | Holtz et al. |
| 2002/0049717 | A1 | 4/2002 | Routtenberg et al. |
| 2002/0151998 | A1 | 10/2002 | Kemppi et al. |
| 2003/0001880 | A1 | 1/2003 | Holtz et al. |
| 2003/0187657 | A1 | 10/2003 | Erhart et al. |
| 2004/0117838 | A1 | 6/2004 | Karaoguz et al. |
| 2004/0224293 | A1 * | 11/2004 | Penning et al. ............... 434/219 |
| 2006/0009199 | A1 | 1/2006 | Mittal |
| 2006/0265503 | A1 * | 11/2006 | Jones et al. ................... 709/227 |
| 2007/0214485 | A1 * | 9/2007 | Bodin et al. .................. 725/101 |

* cited by examiner

*Primary Examiner* — Thanh Vu
(74) *Attorney, Agent, or Firm* — Law Office of Jim Boice (57) ABSTRACT

A computer-implementable method, system, and computer program product that creates a podcast template within a portal definition environment is presented. In one embodiment, the method includes the steps of: creating a standard two-dimensional portal page; and rendering a one-dimensional portlet from the standard two-dimensional portal page to create a podcast.

3 Claims, 11 Drawing Sheets

PORTAL-BASED PODCAST DEVELOPMENT

BACKGROUND OF THE INVENTION

The present invention relates in general to the field of computers and similar technologies, and in particular to software utilized in this field. Still more particularly, the present invention describes a novel approach to creating a one-dimensional portlet for an item such as a podcast.

A portal (a.k.a. "web portal") utilizes a customizable webpage to provide personalized browsing capability to a World Wide Web ("Web") user. A portal may be general or specialized. For example, a general portal (such as a browser window) typically contains a search window, through which a user can search for desired content. A specialized portal is typically directed to a targeted audience of users, such as employees of an enterprise, etc.

Figure 1:
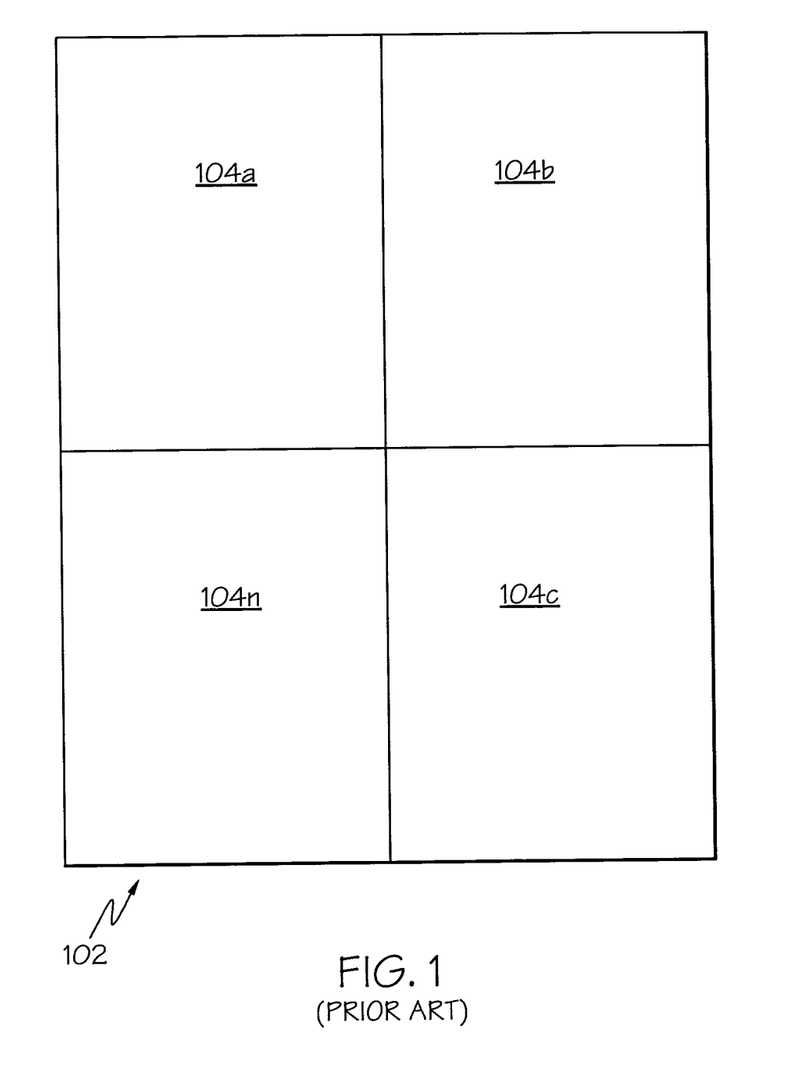
FIG. 1 illustrates a prior art portal page.

As described in the Java™ Portlet Specification ("Java™ Portlet Specification, Version 1.0, published Oct. 7, 2003 by Sun Microsystems, Inc., and incorporated herein by reference in its entirety), a portal page typically uses multiple portlets, which are web components, managed by a portlet container that provides a runtime environment for portlets. For example, as shown in FIG. 1, a portal page 102 is composed of multiple portlet windows 104a-n, each of which displays a different two-dimensional (2D) content (having non-serial data that can be accessed in a random manner). Each portlet window 104 may be fixed to a particular content provider (e.g., only content from a particular website such as www.ibm.com), or a portlet may be conditional (e.g., providing weather information relevant to a user who lives in Zip code 27845). The portlets are managed and provided by a portal server (not shown), which provides web content and controls Uniform Resource Locators (URLs) associated with each portlet.

SUMMARY OF THE INVENTION

The present invention modifies the concept described above for a 2D portal page to create a one-dimensional (1D) portlet, such as a podcast. Thus, the present invention provides a computer-implementable method, system, and computer program product that creates a podcast template within a portal definition environment. In one embodiment, the method includes the steps of: creating a standard two-dimensional portal page; and rendering a one-dimensional portlet from the standard two-dimensional portal page to create a podcast.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 2A:
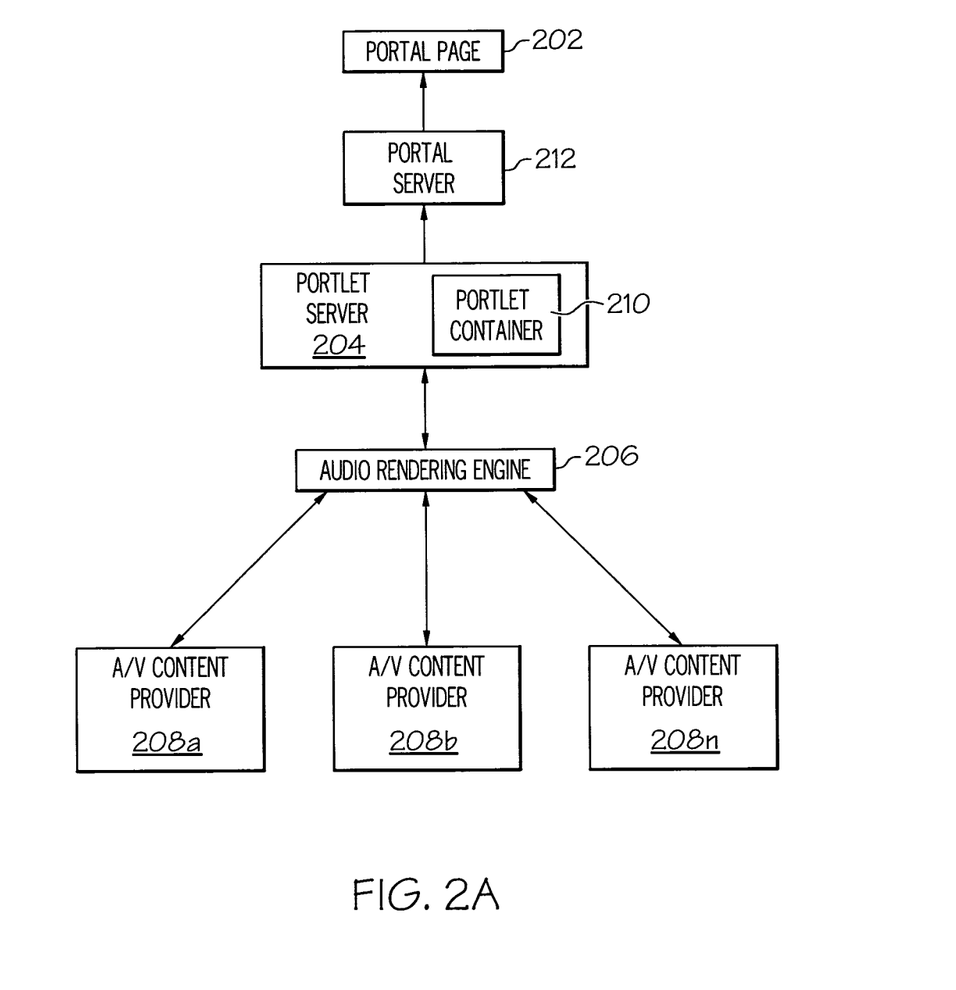
FIG. 2a depicts a relationship between an ultimately rendered portal page, which includes one-dimensional portlet window, and one-dimensional content providers.

With reference now to FIG. 2a, there is depicted an overview of a relationship between an ultimately rendered portal page and various audiovisual content providers used in rendering a portal page that includes one-dimension portlet windows. As depicted, a portal page 202 is in communication with a portal server 212, which is in communication with a portlet server 204. Portlet server 204 provides portlet windows to portal server 212, which renders the portal page 202 in accordance with the "Java™ Portlet Specification" ("Java™ Portlet Specification, Version 1.0, published Oct. 7, 2003 by Sun Microsystems, Inc., and incorporated herein by reference in its entirety). Contrary to traditional two-dimensional (2D) only renderings, however, the portal page 202 will also include at least one portlet window that is one-dimensional (1D). (Note that the 1D portlet window is NOT a link to audio, video or audiovisual content, but rather the 1D portlet window is an actual rendering of the 1D content itself.) The portlet server 204 includes a customized portlet container 210, which includes the functionality to consolidate multiple one-dimensional content files (including audio files, video files, and/or audio-video files) for rendering into a one-dimensional portlet window. This process is assisted through the use of an audio rendering engine 206, whose logical relationship is to provide the portlet server 204 with access to one-dimensional files from multiple audiovisual content providers 208a-n. Note that audio rendering engine 206 may be replaced by or incorporate the functions of any one-dimensional content, including but not limited to video, audio and/or audiovisual content.

Figure 2B:
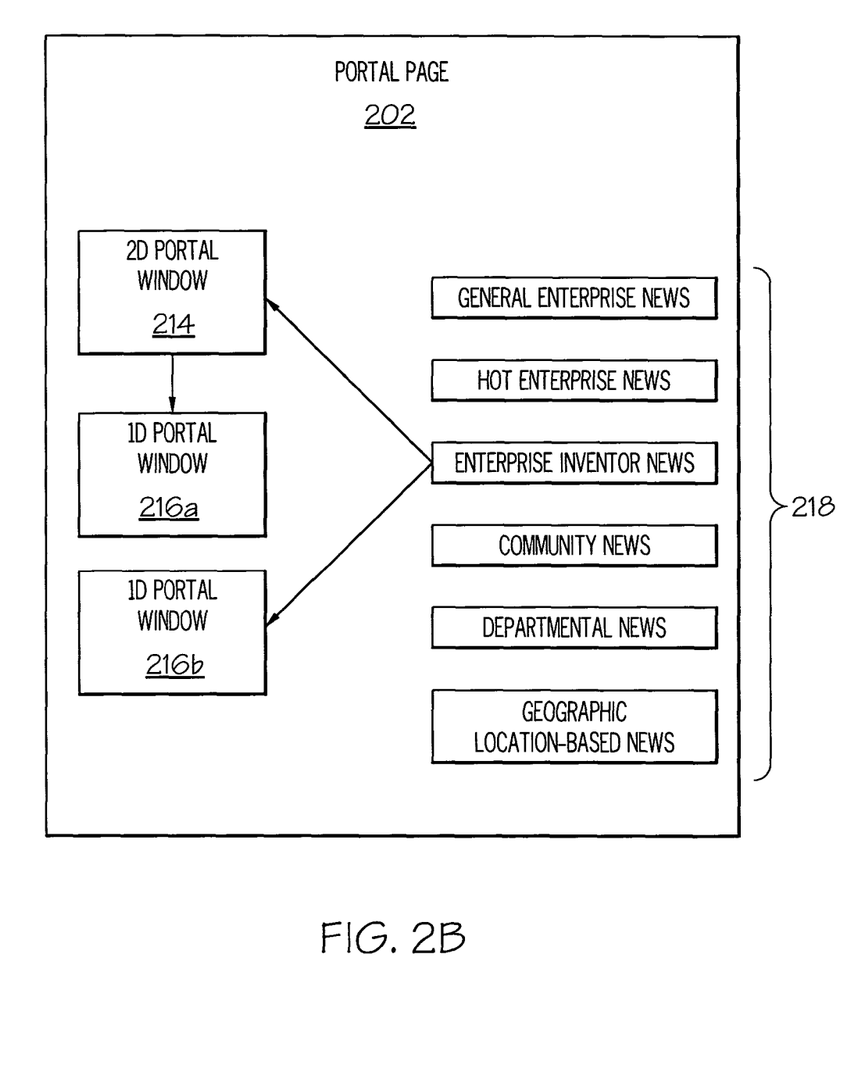
FIG. 2b illustrates additional detail of a portal page in accordance with the present invention.

With reference now to FIG. 2b, consider the details of an exemplary portal page 202. As with a traditional two-dimensional (2d) portal page, portal page 202 may include a 2D portal window 214, which may be HyperText Markup Language (HTML) coded text. In addition, the inventive portal page 202 includes one or more one-dimensional (1D) portal windows 216, each of which is an audio, video or mixed media (audiovisual) presentation window. The 1D portal window 216a is derived according to parameters established in 2D portal window 214. That is, assume that 2D portal window 214 displays HTML content related to a descriptor 218 named "Enterprise Inventor News." When 1D portal window 216a is rendered, either directly from an outside multimedia source or from HTML text content found in 2D portal window 214, 1D portal window 216a will contain only audio and/or video content related to "Enterprise Inventor News," as defined by the architect of portal page 202 and determined by the parameters set by the 2D portal window 214. Conversely, 1D portal window 216*b* is independent of any parameters set by the 2D portal window 214 and, while developed using only audio and/or video content that is retrieved from another source, still has been categorized as "Enterprise Inventor News."

Note that each 1D portal window 216 may be prioritized for creation and/or display by an enterprise. For example, assume that an enterprise wants all employees to have access to 1D content related to "General Enterprise News." In that case, all employees' internal enterprise webpages would be populated with a 1D portal window 216 that renders 1D content related to that descriptor. Similarly, the enterprise can define which employees, departments, job descriptions/titles, etc. have webpages that render specifically defined (according to descriptors 218) 1D content.

Figure 3A:
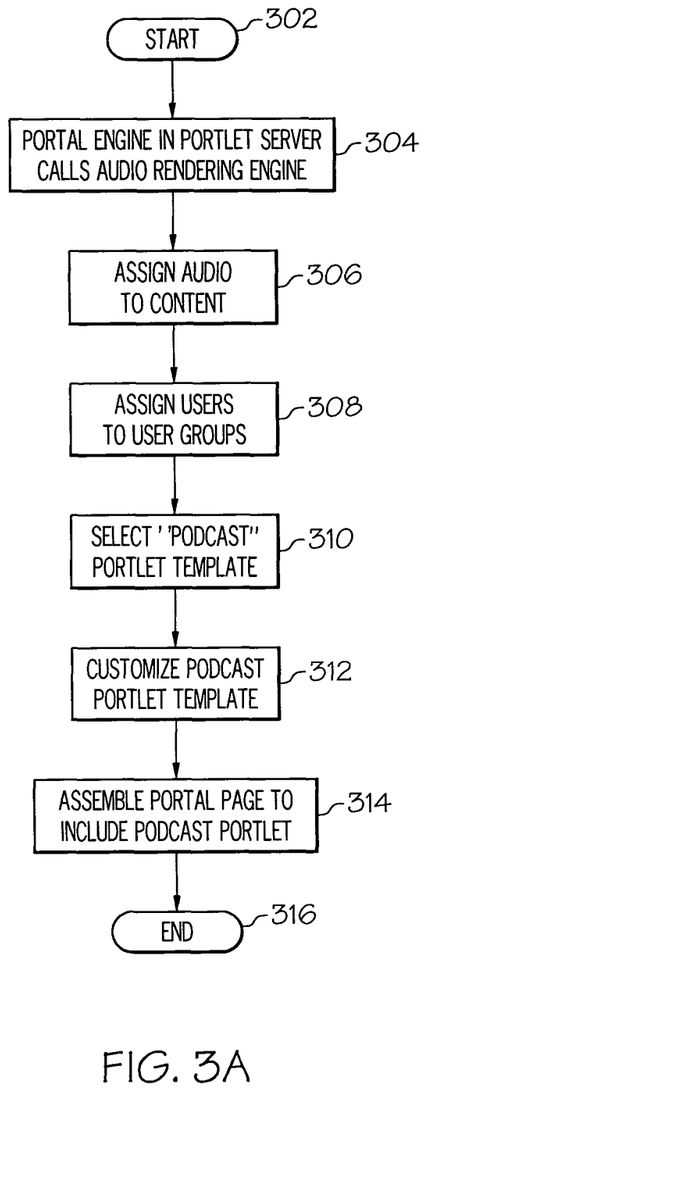
FIG. 3a is a flow-chart showing exemplary steps taken to construct a one-dimensional portlet window in an otherwise two-dimensional portal page.

Referring now to FIG. 3*a*, a flow-chart of exemplary steps taken to render a portal page having at least one one-dimensional portlet window is presented. After initiator block 302, a portal engine (utilizing the customized portlet container 210 shown in FIG. 2*a*) calls the audio rendering engine (206 in FIG. 2*a*) instead of a standard web rendering engine (block 304). This enables the creation of a one-dimensional, rather than a two-dimensional, portlet window. As shown in block 306, audio (or other one-dimensional content) is then assigned to particular content groups. In one embodiment, this assignment is performed by a podcaster who is creating the content that will make up the one-dimensional portlet window. Optionally, as shown in block 308, users that are to have access to a podcast (or similar content) are assigned to a user group.

The podcaster then chooses a "podcast" portlet template (block 310), which creates a one-dimensional portlet window in a portal page (which may have been previously created as an otherwise traditional two-dimensional portal page). Different portlet templates can be built for different types of podcast content (e.g., audio, video, mixed media, etc.), thus allowing the podcaster to utilize a pre-configured portlet template according to the type of content to be podcasted. Additionally, each different portlet template can be associated with a particular portal page, thus further defining the nature of that particular portal page. Thus, as described in block 312, a podcast portlet template can be customized for a content type, a particular portal page, or according to some other parameter (e.g., the user's zip code, the user's job description, employer, section, etc., the user's hobby interest(s), etc. At this point, audio, video or multimedia content is retrieved from a repository and passed to the rendering engine (e.g., audio rendering engine 206 shown in FIG. 2*a*) to create the appropriate 1D portal window. Finally, as described in block 314, the podcast portal page is assembled using the new one-dimensional portlet template. Some of the content rendered by the one-dimensional portlet template may be optional (according to options selected by an ultimate viewer), while other content may be mandatory for viewing (such as advertising, surveys, etc.). All or any of these components may be enabled for personalization, if so desired by the podcaster. The process ends at terminator block 316.

Figure 3B:
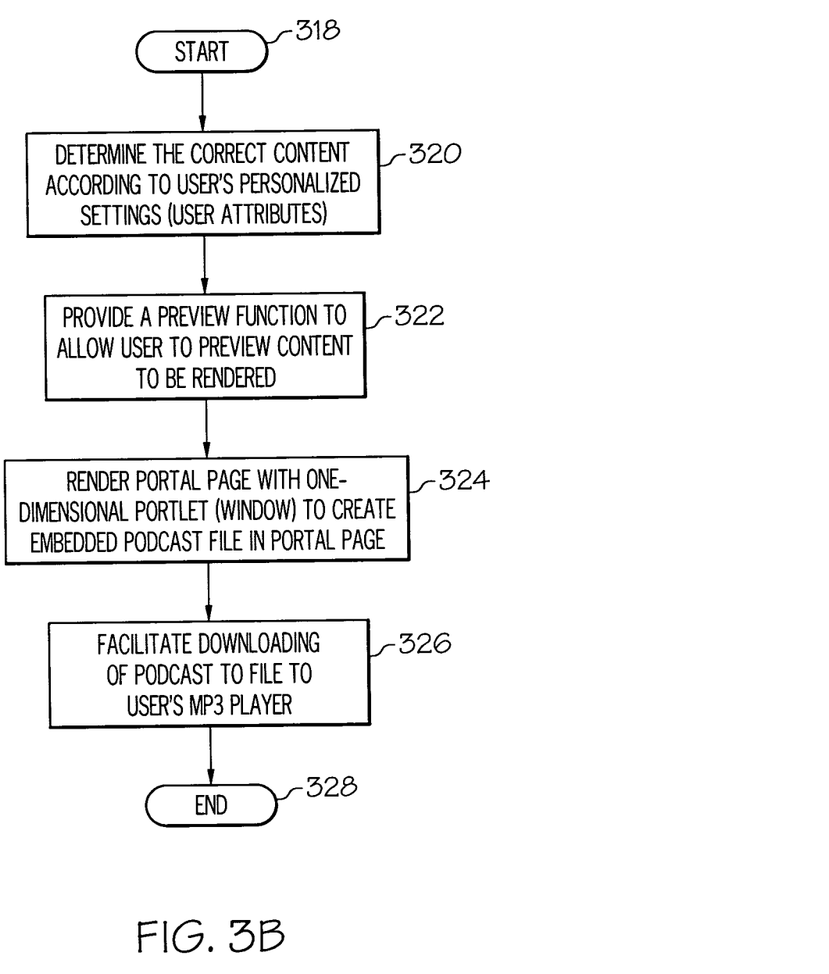
FIG. 3b is a flow-chart showing exemplary steps taken to deliver a one-dimensional portlet to a user.

Referring now to FIG. 3*b*, a flow-chart is presented showing exemplary steps taken by a portal server for the benefit of a user who is accessing the portal page with the one-dimensional rendered portlet window. After initiator block 318, the portal server (such as portal server 212 shown in FIG. 2*a*), determines the correct content for a one-dimensional content (e.g., a podcast) according to the user's personalized settings (block 320). These settings may be selected, learned, or otherwise determined from any source, including a user's information and attributes, as described in section PLT.17.1-3 of the Java™ Portlet Specification. Optionally, a preview function can then be executed by the portal server (block 322). This preview function allows a user to quickly preview (either by listening to or watching a portion of the podcast file, or by looking over a summary description of the podcast file) some of the content to be rendered in the podcast file.

As described in block 324, the portal page is then rendered using an audio rendering engine to retrieve content from a repository and to create the one-dimensional portlet window that is part of the portal page. This step is where the podcast file is actually built and created (using steps described above), and is NOT the establishment of a link in the portal page to a previously created podcast. Finally, as described in block 326, the portal server may provide logic that allows the user to download the podcast into an MP3 player (or similar storage/playing device). The process ends at terminator block 328.

Figure 4:
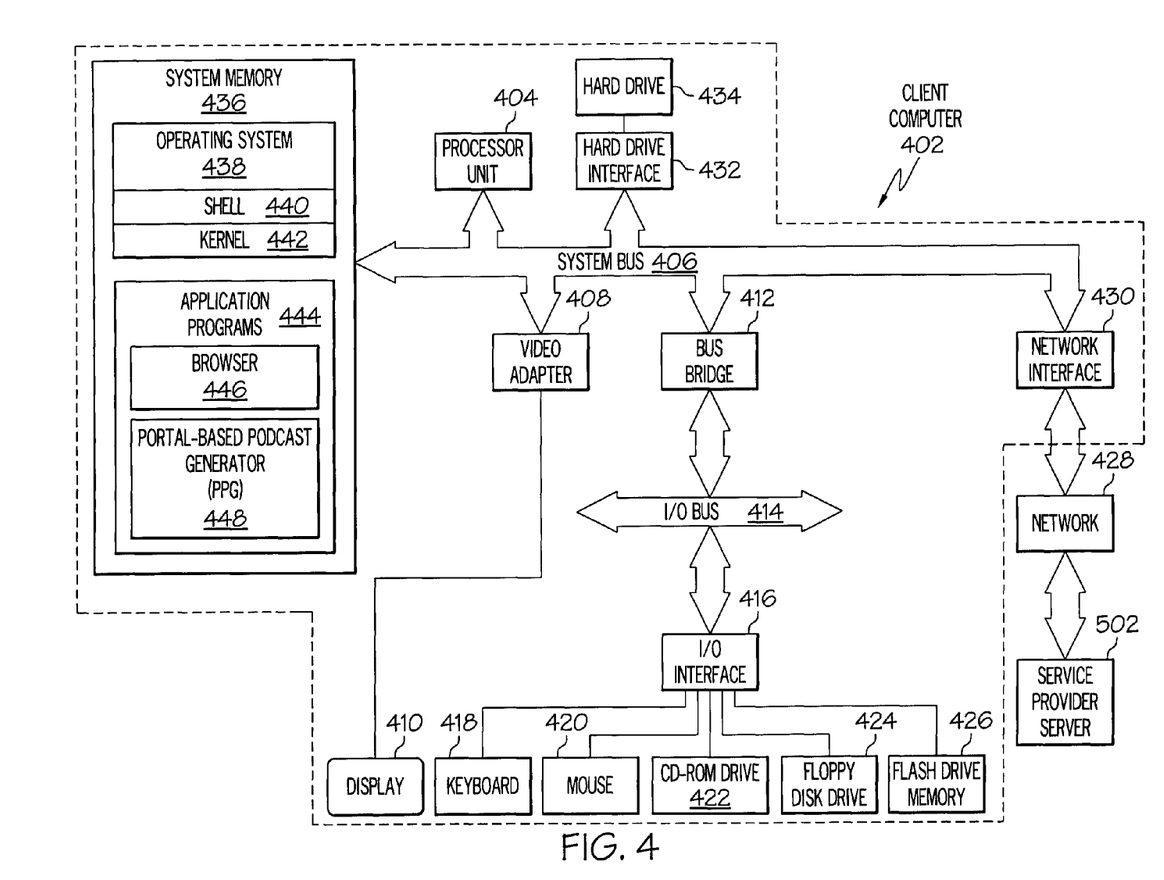
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Portal-based Podcast Generator (PPG) 448, which includes logic for storing pre-dropped components in memory before, during, and after final execution of the objects through the IDE. PPG 448 includes code for implementing the processes described in FIGS. 2a-3b. In one embodiment, client computer 402 is able to download PPG 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
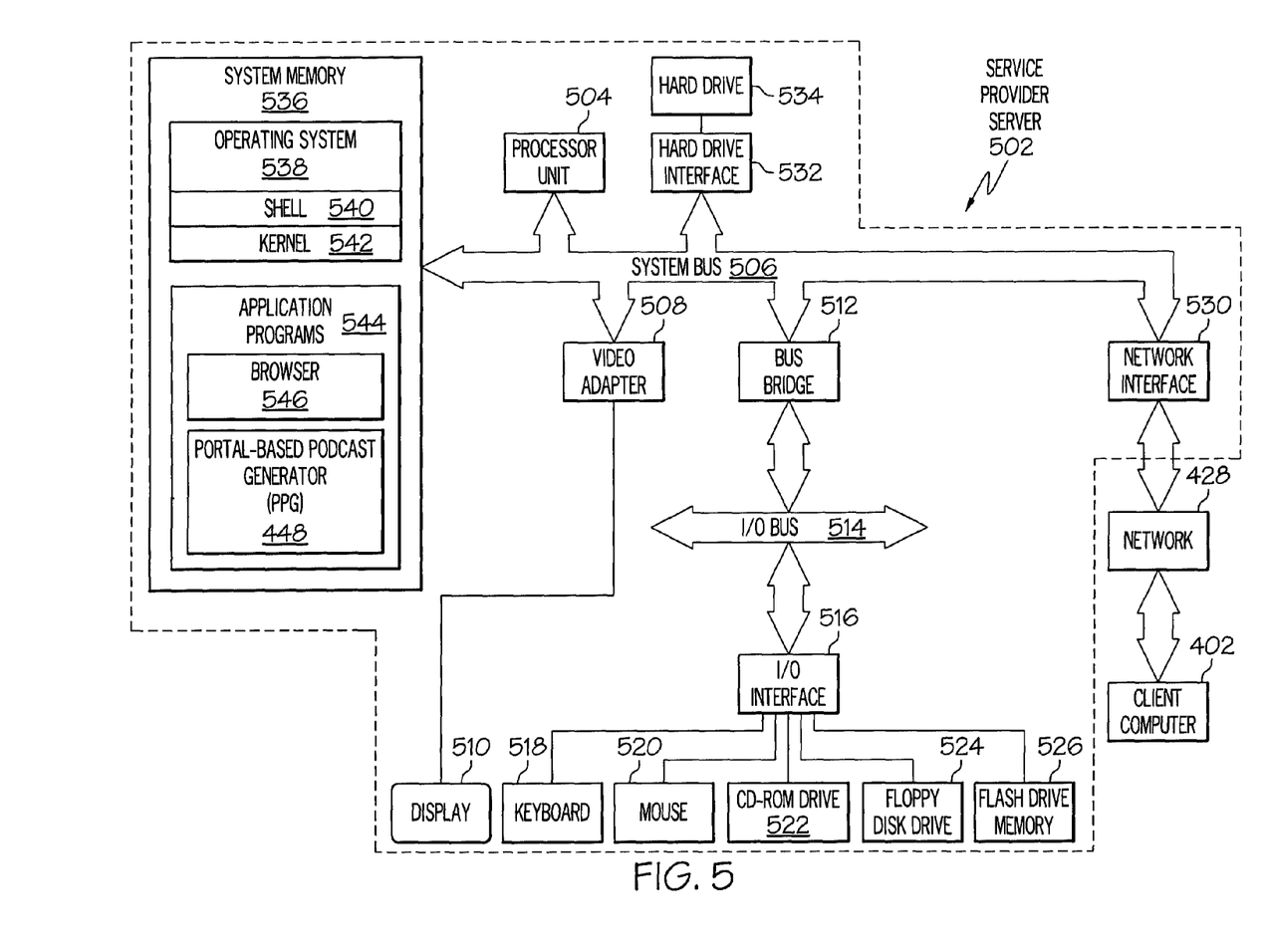
FIG. 5 illustrates an exemplary server from which software for executing the present invention may be deployed and/or implemented for the benefit of a user of the client computer shown in FIG. 4.

As noted above, PPG 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download PPG 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of PPG 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of PPG 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of PPG 448, are performed by service provider server 502. Alternatively, PPG 448 and the method described herein, and in particular as shown and described in FIGS. 2a-3b, can be deployed as a process software from service provider server 502 to client computer 402. Still more particularly, process software for the method so described may be deployed to service provider server 502 by another service provider server (not shown).

Figure 6A:
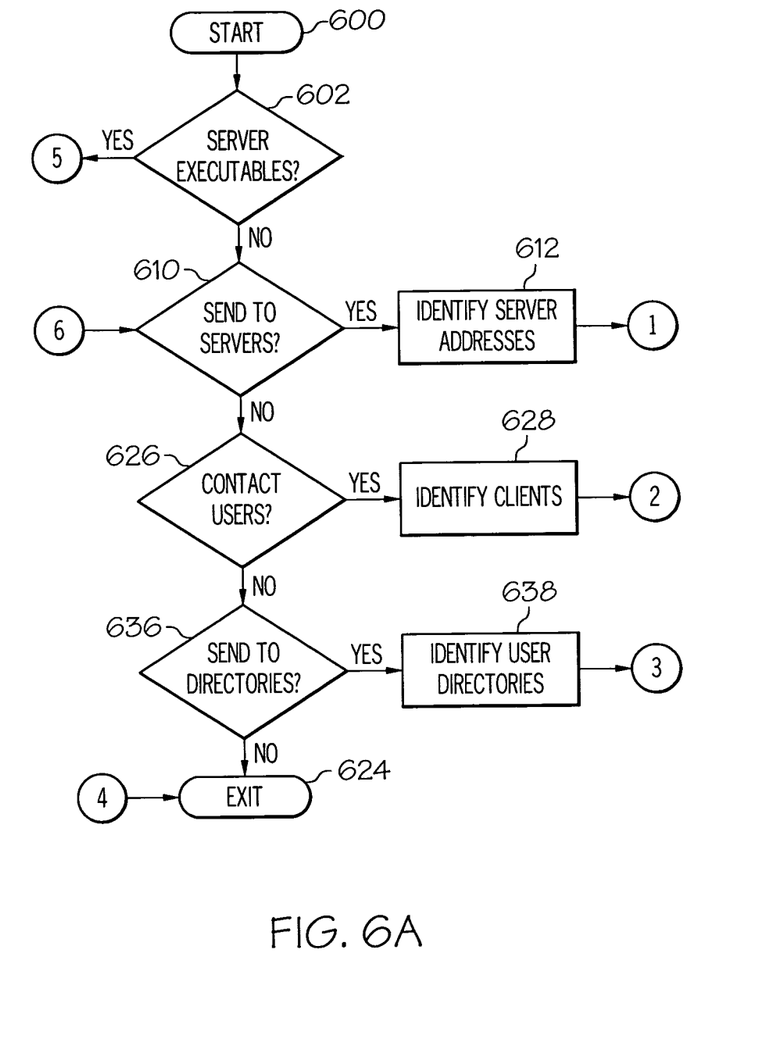
FIGS. 6a-b show a flow-chart of steps taken to deploy software capable of executing the steps shown and described in FIGS. 2a-3b.
Figure 6B:
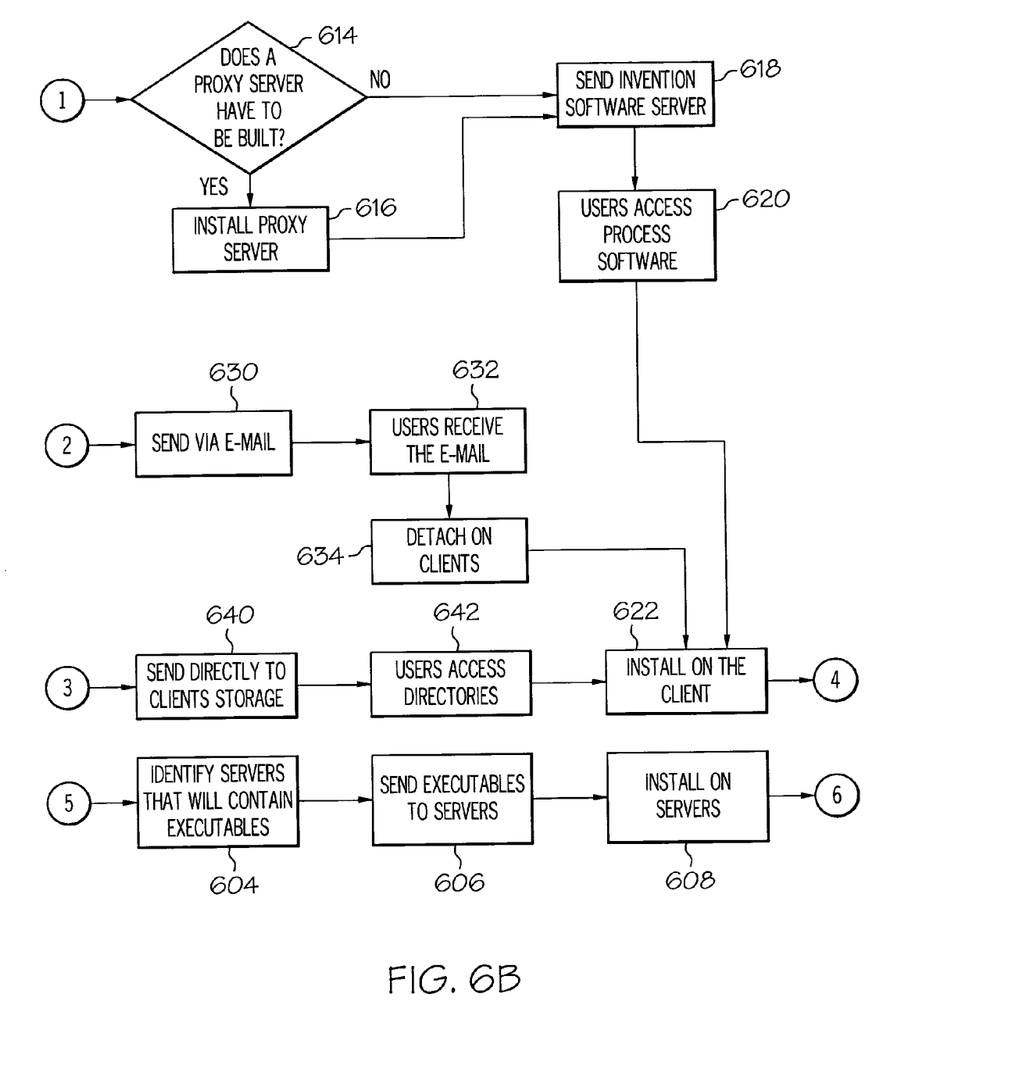

Referring then to FIGS. 6a-b, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made as to whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
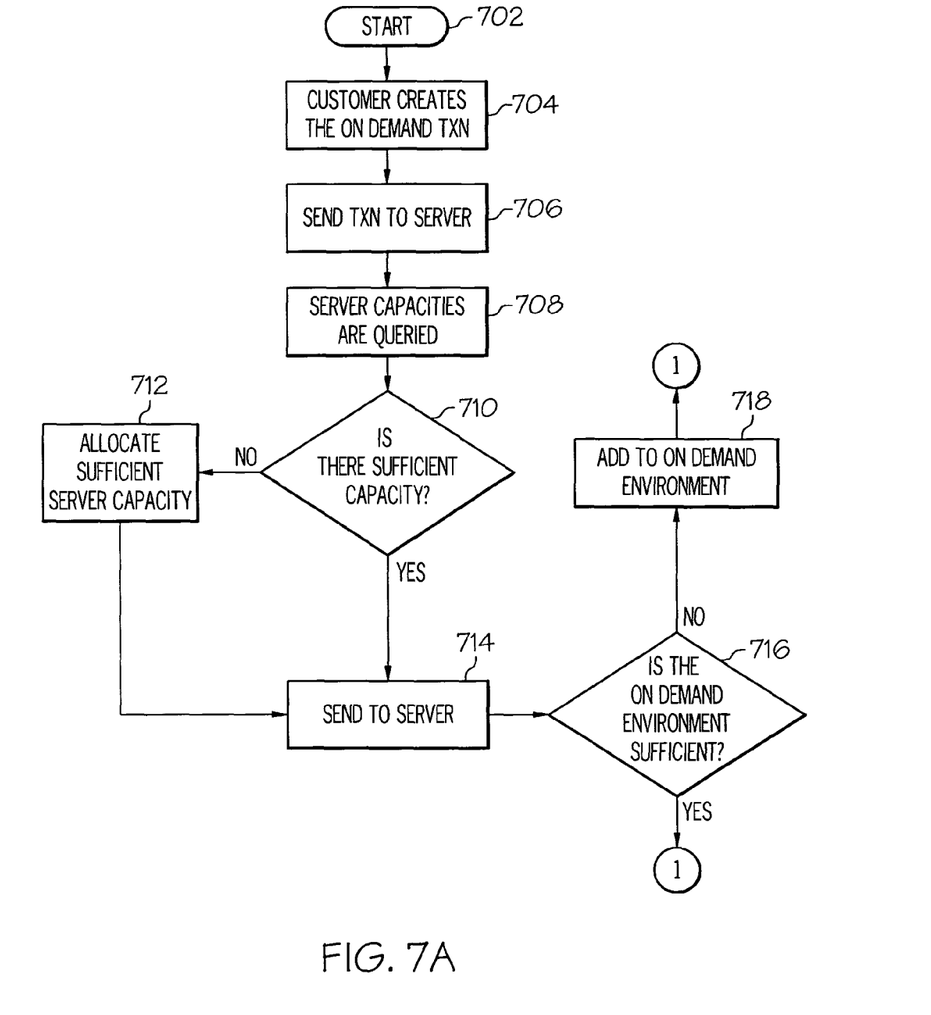
FIGS. 7a-b show a flow-chart showing steps taken to execute the steps shown and described in FIGS. 2a-3b using an on-demand service provider.
Figure 7B:
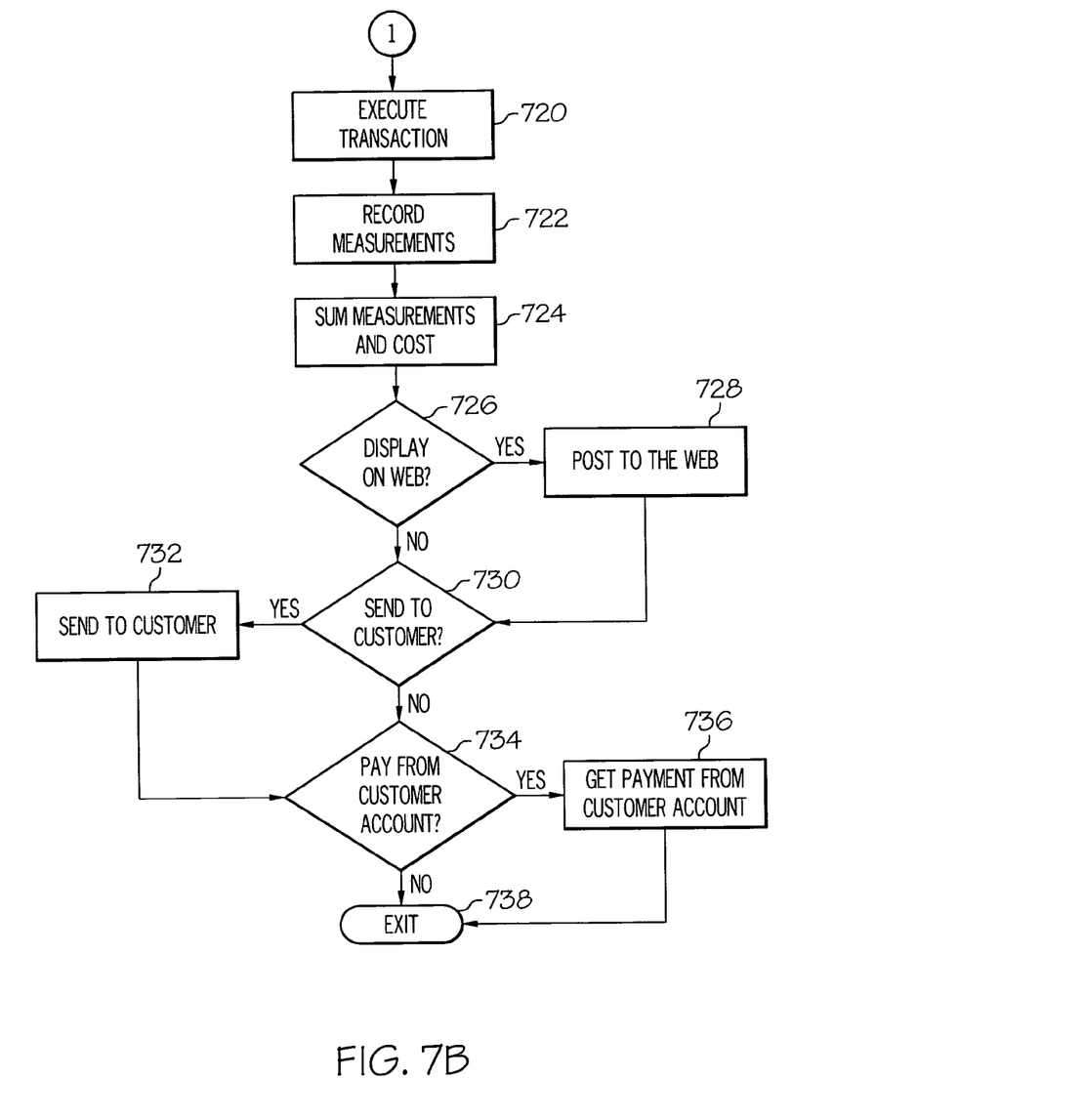

With reference now to FIGS. 7a-b, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient Available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

The present invention thus provides a procedure for creating a one-dimensional content, such as a podcast. In one embodiment, the method includes the steps of creating a standard two-dimensional portal page, which in one embodiment complies with JSR 168, wherein JSR 168 is a standardized Java™ portlet specification, and wherein the two-dimensional portal page includes at least one portlet; and modifying a layout of the portlet from being two-dimensional to one-dimensional to create a one-dimensional portlet in the otherwise standard two-dimensional portal page. The podcast may be an aggregation of separate MP3 files, which are obtained from different content providers. In one embodiment, the one-dimension portlet is customized by created by installing multiple podcasts, from the different content providers, into the one-dimensional portlet, according to a user's user-defined criterion that pre-exists in a two-dimensional portlet of the otherwise standard two-dimensional portal page. Examples of such user-defined criteria are a user's geographic location, employer and work section.

While the present invention has been particularly shown and described with reference to a preferred embodiment, it will be understood by those skilled in the art that various changes in form and detail may be made therein without departing from the spirit and scope of the invention. For example, while the term "MP3 file" has been used to describe files that may be utilized in the present invention, it is understood that the term "MP3 file" is expanded to include, in the specification as well as in the claims and their construction, any similar media format and/or follow-on technology (including that which complies with any new version of the MP3 or MPx standard). Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
   creating a portal page;
   rendering a two-dimensional portlet window and a one-dimensional portlet window in the portal page, wherein the one-dimensional portlet window is an actual rendering of a podcast that is an aggregation of separate audio files, wherein the one-dimensional portlet window is not a link to one or more of the aggregation of separate audio files, wherein the one-dimensional portlet window is associated exclusively with the two-dimensional portal window, wherein the one-dimensional portlet window includes only audio content that is related to content described by the two-dimensional portlet window, and wherein the separate audio files are obtained from different content providers;

installing multiple podcasts, from the different content providers, into the one-dimensional portlet window, according to a user's user-defined criterion that pre-exists in a two-dimensional portlet window of the portal page, wherein the user-defined criterion is based on a user's geographic location, employer and work section;

utilizing an audio rendering engine to render the audio content from the one-dimensional portlet window into a podcast file; and presenting a preview of the podcast file to a user, wherein the preview is a portion of audio content from the podcast file, wherein the computer executable instructions are deployable to a client computer from a server at a remote location, and wherein the computer executable instructions are provided by a service provider to a customer on an on-demand basis.

2. A system comprising:

a processor;

a data bus coupled to the processor;

a memory coupled to the data bus; and a computer-usable medium embodying computer program code, the computer program code comprising instructions executable by the processor and configured for:

creating a portal page;

rendering a two-dimensional portlet window and a one-dimensional portlet window in the portal page, wherein the one-dimensional portlet window is an actual rendering of a podcast that is an aggregation of separate audio files, wherein the one-dimensional portlet window is not a link to one or more of the aggregation of separate audio files, wherein the one-dimensional portlet window is associated exclusively with the two-dimensional portal window, and wherein the separate audio files are obtained from different content providers;

installing multiple podcasts, from the different content providers, into the one-dimensional portlet window, according to a user's user-defined criterion that pre-exists in a two-dimensional portlet window of the portal page, wherein the user-defined criterion is selected from one or more criteria in a group composed of a user's geographic location, employer and work section;

utilizing an audio rendering engine to render the audio content from the one-dimensional portlet window into a podcast file; and presenting a preview of the podcast file to a user, wherein the preview is a portion of audio content from the podcast file, wherein the computer executable instructions are deployable to a client computer from a server at a remote location, and wherein the computer executable instructions are provided by a service provider to a customer on an on-demand basis.

3. A tangible computer-usable medium on which is stored computer program code, the computer program code comprising computer executable instructions configured for:

creating a portal page;

rendering a two-dimensional portlet window and a one-dimensional portlet window in the portal page, wherein the one-dimensional portlet window is an actual rendering of a podcast that is an aggregation of separate audio files, wherein the one-dimensional portlet window is not a link to one or more of the aggregation of separate audio files, wherein the one-dimensional portlet window is associated exclusively with the two-dimensional portal window, and wherein the separate audio files are obtained from different content providers;

installing multiple podcasts, from the different content providers, into the one-dimensional portlet window, according to a user's user-defined criterion that pre-exists in a two-dimensional portlet window of the portal page, wherein the user-defined criterion is selected from one or more criteria in a group composed of a user's geographic location, employer and work section;

utilizing an audio rendering engine to render the audio content from the one-dimensional portlet window into a podcast file; and presenting a preview of the podcast file to a user, wherein the preview is a portion of audio content from the podcast file, wherein the computer executable instructions are deployable to a client computer from a server at a remote location, and wherein the computer executable instructions are provided by a service provider to a customer on an on-demand basis.

* * * * *